United States Patent
Widla et al.

(10) Patent No.: US 8,132,654 B2
(45) Date of Patent: Mar. 13, 2012

(54) HYDRAULIC DAMPER WITH COMPENSATION CHAMBER

(75) Inventors: Waldemar Widla, Krakow (PL); Pawel Slusarczyk, Myslenice (PL); Jakub Wrzesinski, Krakow (PL); Krystian Marcin Andres, Debno (PL)

(73) Assignee: BWI Company Limited S.A., Luxembourg (LU)

( * ) Notice: Subject to any disclaimer, the term of this patent is extended or adjusted under 35 U.S.C. 154(b) by 442 days.

(21) Appl. No.: 12/431,402

(22) Filed: Apr. 28, 2009

(65) Prior Publication Data

US 2009/0321203 A1 Dec. 31, 2009

(30) Foreign Application Priority Data

May 2, 2008 (EP) .................................. 08008328
Jun. 25, 2008 (GB) .................................. 0811611.3

(51) Int. Cl.
*F16F 9/34* (2006.01)
(52) U.S. Cl. .................................. 188/322.14; 188/315
(58) Field of Classification Search .................. 188/271, 188/284, 313, 314, 315, 322.14; 16/51, 58
See application file for complete search history.

(56) References Cited

U.S. PATENT DOCUMENTS

| | | | | |
|---|---|---|---|---|
| 2,619,199 A | * | 11/1952 | Schwary | 188/284 |
| 2,729,308 A | * | 1/1956 | Koski et al. | 188/284 |
| 2,742,112 A | * | 4/1956 | Wessel | 188/284 |
| 4,650,043 A | * | 3/1987 | Eckersley | 188/322.14 |
| 4,768,629 A | * | 9/1988 | Wossner | 188/284 |
| 5,333,708 A | * | 8/1994 | Jensen et al. | 188/322.14 |

FOREIGN PATENT DOCUMENTS

| | | |
|---|---|---|
| DE | 811319 | 8/1951 |
| DE | 3510866 A1 * | 10/1986 |
| DE | 3602224 | 7/1987 |
| EP | 0409094 A1 | 1/1991 |

OTHER PUBLICATIONS

European Search Report dated Oct. 7, 2008.

* cited by examiner

*Primary Examiner* — Thomas J Williams
(74) *Attorney, Agent, or Firm* — Dickinson Wright PLLC

(57) ABSTRACT

The invention relates to a hydraulic damper, in particular for the suspension system of a motor vehicle, comprising a tube filled with working fluid; a piston assembly slidably positioned inside the tube; a fluid compensation chamber located outside of the tube, and a base valve assembly at the end of the tube for controlling the flow of working fluid between the tube and the compensation chamber. A compression valve module added between the piston assembly and the base valve assembly allows the damping to increase during extremely fast compression strokes without modification of the other damper components, affecting neither tuning options nor performance in a normal operating range of piston velocities.

17 Claims, 4 Drawing Sheets

HYDRAULIC DAMPER WITH COMPENSATION CHAMBER

TECHNICAL FIELD

The present invention relates to a hydraulic damper with a compensation chamber (usually configured or referred to as a twin-tube damper), and in particular to a hydraulic damper for the suspension system of a motor vehicle.

BACKGROUND OF THE INVENTION

Suspension dampers of this kind generally comprise a tube filled with working fluid, inside of which a slidable piston assembly is placed. The piston assembly is attached to a piston rod led outside the damper through a piston rod guide, and comprises a piston with rebound and compression valve assemblies, which control the flow of working fluid passing through the piston assembly during the rebound and the compression stroke of the damper. A base valve assembly located at the end of the tube of the damper opposite to the piston rod and provided with separate rebound and compression valve assemblies controls the flow of working fluid passing in and out of a compensation chamber, commonly formed between the inner and the outer tube of the damper. Each valve assembly usually comprises a stack of resilient disks, often supported by an additional compression spring, which cover the flow passages of the assembly and act as one way valve, deflecting or moving under the pressure of working fluid to allow or block its flow.

Typical damper characteristics of damping force vs. piston velocity is a trade-off between improvement of the car handling properties and reduction of the unwanted car vibrations (a so called NVH-Noise, Vibration, Harshness requirements). Although dampers featuring low compression forces with degressive characteristics are desired to improve passengers comfort, during severe road and/or drive conditions they also often lead to maximally admissible wheel-knuckle displacements in the direction of damper compression leading to a suspension closure or jounce bumper engagement, which in turn may affect the car safety, comfort, durability and noise issues.

There are known dampers in the art in which the damper compression force increases rapidly after reaching a certain velocity of the piston relative to the damper tube.

An exemplary damper of this type, disclosed in patent specification EP 1 215 414, comprises a valve body fixed to the piston rod and urged away from a valve seat surface formed on the piston by a spring. The valve body has a conical surface which moves toward the valve seat surface as a function of dynamic pressure of working fluid, bearing against the circular valve seat surface and making a linear contact in a closed position. The valve body is made of a plastic material and its outer diameter corresponds to the diameter of the damper tube. To prevent undefined leakage flows the valve body is sealed to the piston rod.

Another damping unit of this type, to be employed in particular for damping the movement of the vehicle steering device, is disclosed in patent specification EP 0 409 094. The unit comprises two annular valve members allocated to each side of valve seat faces of the piston and urged towards the respective opening positions by a plurality of compression springs provided within axial bores of the piston, wherein at least one face of a pair of the piston valve seat face and the valve face allocated to each other is provided with axial projections and recesses, which in a damping position provide a restricted flow communication for working fluid.

Yet another damper having an additional damper valve is disclosed in patent specification EP 1 538 367. The damper comprises a multipart control slide with a pressure-actuated surface, which can move in a closing direction to close a throttle, where the throttle point is determined by the outside diameter of the control slide and an inside wall of the damper tube. The control slide of this invention must be manufactured very precisely in order to achieve its proper operation, and to minimize this issue it has a plastically deformable adjusting area.

Similar dampers utilizing technical means substantially analogous to the ones above-mentioned have been also disclosed in patent specifications U.S. Pat. No. 6,318,523 and U.S. Pat. No. 6,199,671.

SUMMARY OF THE INVENTION

An object of the present invention is to provide a compression valve module for existing suspension dampers with a compensation chamber, which might be simply employed as an add-on device, affecting neither tuning options nor performance of rebound and compression valve assemblies of their base valve assemblies in normal operating range of the piston velocities but beneficially increasing an amount of dissipated energy during extremely fast compression strokes. Such a compression valve module should comprise only a few simple components, as compared to known designs, and share comparable working characteristic within a large range of dimensional tolerances of these components therefore minimizing the production specific losses, and consequently decreasing the costs of large scale production.

In order to accomplish the aforementioned and other objects, a damper of the kind mentioned in the outset, according to the present invention comprises a compression valve module which is attached to the base valve assembly inside the tube and comprises a substantially rigid disc having an outside diameter less than the inner diameter of the tube, an outer tubular member secured to the tube, an inner cylindrical member substantially coaxial with the outer tubular member, at least one radially extending bridge member securing the inner cylindrical member to the outer tubular member, an abutment surface for the disc defined by the inner cylindrical member and/or the outer tubular member, retaining means secured to the inner cylindrical member and/or the outer tubular member and defining the disc open position spaced from the abutment surface in an axial direction, and a spring acting on the disc to bias the disc to its open position, wherein the disc is movable between the open position to allow free fluid flow through the compression valve module and the abutment surface to substantially prevent or restrict fluid flow through at least one flow passage.

The compression valve module forms a normally open, quick-closing, throttling valve which operation is independent of the piston position and dependent only on the piston velocity. The valve module comprises only a few additional components which provide easy tuning of the engagement velocities and force gains. As the annular area between the disc and the inner surface of the damper tube enables a substantially unrestricted flow of working fluid in normal operating range of piston velocities, the acceptable dimensional tolerance of the disc is largely increased. The compression valve module can be formed as a separate sub-assembly and installed in a hydraulic damper when required without modification of the other components of the damper.

The flat floating disc enables improved valve dynamics due to its low mass which beneficially affects a shorter valve response, low impact forces during triggering, and insensitivity on inertial forces caused by the unsprung mass acceleration. The valve module wear is decreased due to low impact loading and wide flat contact surfaces. The term "floating" means that without the force of the spring, the disc would be free to displace along and rotate around the piston rod axis.

On the other hand the spring prevents fluctuations in the working fluid, and ensures that the flow of working fluid through the compression valve module components, both in its open and closed positions, shall be substantially laminar with no adverse effect on the operation of the base valve assembly elements.

Preferably the retaining means is a bolt passing through the inner cylindrical member and the disc and being secured to the inner cylindrical member. In such a case the bolt may also be movable in the axial direction.

It is particularly advantageous if the bottom surface of the head of the retaining bolt is provided with an annular recessed grove which directly adjoins the outer surface of the bolt shaft.

Alternatively the retaining means is a cup-shaped cage member which is secured to the outer tubular member, the cage member comprising an annular part and a number of shaped arms extending away from the annular part, the shaped arms being attached to the outer tubular member, and the disc open position is defined by an abutment surface of the annular part.

Preferably the inner cylindrical member is substantially tubular, and the spring is retained inside the inner cylindrical member.

Preferably the outer tubular member is provided with an annular recession and the flange corresponding to the type of previous connection between the tube and the base valve assembly of the damper. Owing to such a construction it is particularly easy to upgrade an existing damper by simply detaching a base valve assembly from the bottom end of a tube and subsequently fixing a compression valve module between the upper face of the base valve and the bottom end of the tube.

Preferably the outer tubular member, the inner cylindrical member and the bridges of the compression valve module are made as one element, more preferably by sintering or cold press forming.

The floating disc and/or the outer tubular member preferably comprise at least one flow passage.

If necessary, a damper made according to the invention may also contain a plurality of compression valve modules located in series one on the top of the other.

BRIEF DESCRIPTION OF THE DRAWINGS

The exemplary embodiments of the invention are presented below in connection with the attached drawings on which.

DETAILED DESCRIPTION OF THE INVENTION

Figure 1:
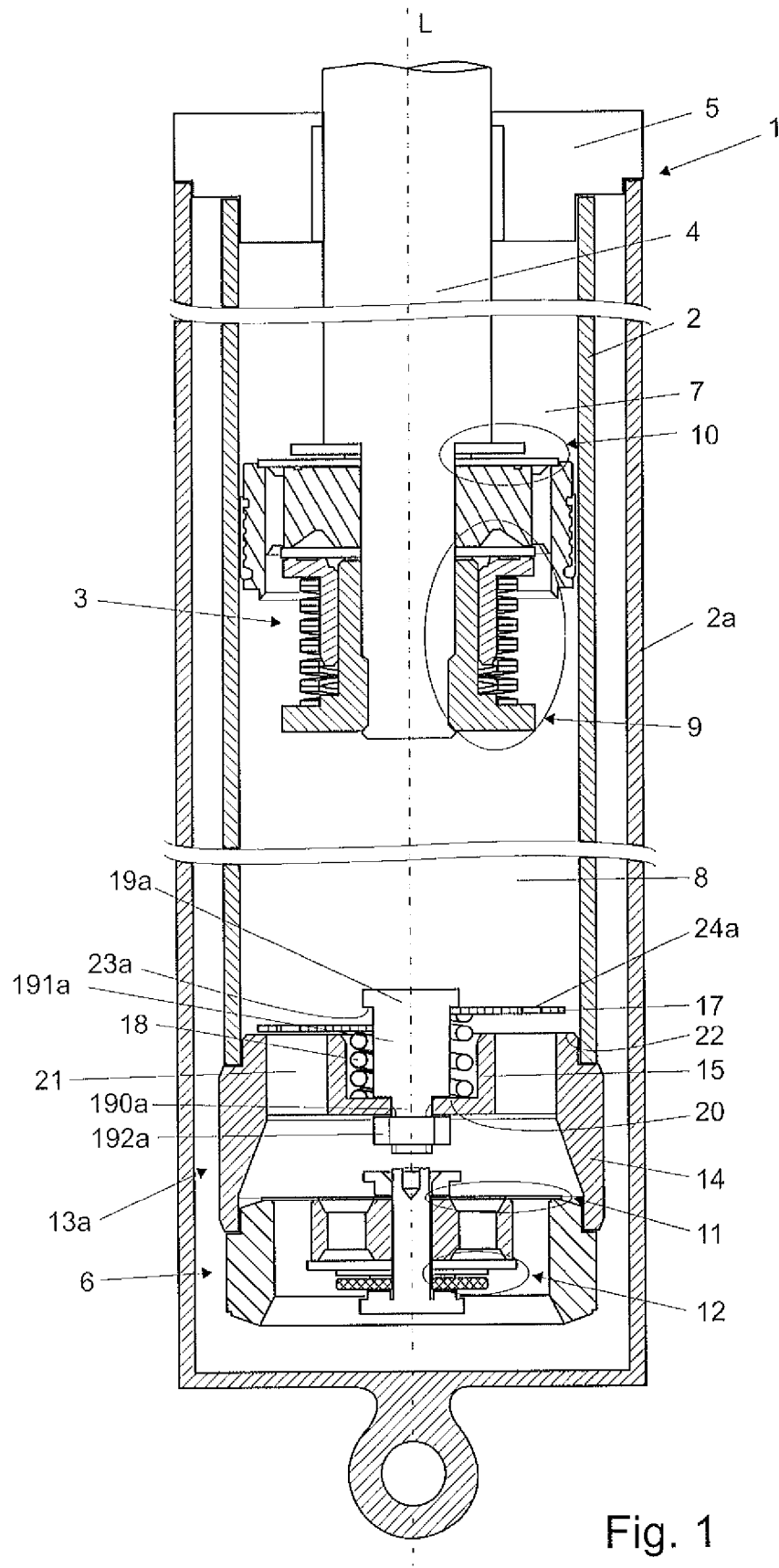
FIG. 1 is a schematic cross-sectional view of a typical twin-tube hydraulic damper showing its main components and provided with a first embodiment of a compression valve module according to the present invention.

The hydraulic damper 1 shown in FIG. 1 is an example of a twin-tube damper comprising an internal tube 2 and an outer tube 2a. Inside the tube 2 filled with working fluid a movable piston assembly 3 is placed. The piston assembly 3 is attached to a piston rod 4 led axially outside the damper 1 through a sealed piston rod guide 5. At the other end of the tube 2 a base valve assembly 6 is placed. The piston assembly 3 makes a sliding fit with the inner surface of the tube 2 and divides the tube 2 into rebound chamber 7 and compression chamber 8. The piston assembly 3 further comprises rebound and compression valve assemblies 9 and 10 with appropriate flow passages, to control the flow of working fluid passing through the piston assembly 3 during the rebound and the compression stroke of the damper 1.

The base valve assembly 6 is also provided with rebound and compression valve assemblies 11 and 12 with appropriate flow passages, to control the flow of working fluid passing between the compression chamber 8 and the compensation chamber formed between the inner 2 and the outer tube 2a of the damper 1.

Further the damper 1 comprises a compression valve module 13a fixed between the base valve 6 and the bottom surface of the internal tube 2 of the damper 1.

The compression valve module 13a according to a first embodiment of the invention is shown in FIG. 1 in closed (first) and opened (second) position respectively on the left and on the right side of the damper longitudinal axis L. The compression valve module 13a comprises an outer tubular member 14 with an inner cylindrical or tubular member 15 connected thereto via a number of radially extending bridge members 16 (cf. FIGS. 2, 5, 6 and 7). The outer tubular member 14, the inner cylindrical member 15 and the bridge members 16 are preferably made as one element in a sintering process using sintered carbides or in a cold press forming process. The outer and inner tubular members 14, 15 are substantially coaxial along the longitudinal axis L. A fluid flow passage 21 is defined between the outer 14 and the inner tubular member 15. The flange of the outer tubular member 14 defines an abutment surface 22 on the side remote from the base valve assembly 6.

Further the valve module 13a comprises a thin, flat and substantially rigid floating disc 17 having outside diameter less than the inner diameter of the tube 2. The ratio of the disc 17 outside diameter to the tube 2 inner diameter is preferably within a range of 0.5 to 0.9. The disc 17 is also provided with a number of angularly distributed flow passages 24a. The disc 17 is movable between a first position in engagement with the abutment surface 22 and a second position in engagement with the bottom surface 23a of the head of the retaining bolt 19a (cf. FIG. 3a). The first position defines the closed position of the compression valve module 13a as the disc 17 engages the abutment surface 22 to close the fluid flow passage 21. The second position defines the disc open position 23 where the disc 17 opens the fluid flow passage 21.

Within the inner cylindrical member 15 a compression spring 18 and retaining means in a form of a retaining bolt 19a are placed. The inner cylindrical member 15 is closed from the bottom with a base surface 20 and the spring 18 is compressed between the base surface 20 and the disc 17 so that the disc 17 supported by the retaining bolt 19a is normally biased into its open (second) position. The spring 18 may be located elsewhere but still act to bias the disc 17 to its normally open position, for example if the inner cylindrical member is solid rather than tubular, in which case, the spring may be positioned between the bridge members 16 and the disc 17 (cf. FIGS. 6, 7).

The base surface 20 of the inner cylindrical member 15 is provided with a centrally situated opening through which the fixing portion 190a of the retaining bolt 19a is passed in such a way that the shaft 191a of the bolt 19a is arranged inside the inner cylindrical member 15 and on the external threaded end of the fixing portion 190a protruding below the base surface 20 a nut 192a is screwed ensuring strong and secure connection.

During the rebound stroke of the piston assembly 3, the working fluid passes through the rebound valve assemblies 9 and 11 and the fluid flow passage 21 of the compression valve module 13a where the disc 17 is in the open position. Also during the compression stroke of the piston assembly 3, within a predefined range of (medium) piston velocities, the working fluid passes through the compression valve assembly 10, the compression valve module 13a which remains open and through the compression valve assembly 12. In other words, presence of the compression valve module 13a does not interfere with the functionality of the valve assemblies 9 and 10 of the piston assembly 3 and with the functionality of the valve assemblies 11 and 12 of the base valve assembly 6 in normal, comfort relevant operating range of piston velocities.

As shown on the left side of the drawing, after reaching a certain threshold of the piston velocity during the compression stroke, the dynamic pressure of the compressed working fluid acting upon the disc 17 exceeds the force of the preloaded compression spring 18, leading to a displacement of the disc 17 towards the abutment surface 22 formed on the flange of the outer cylindrical member 14 of the compression valve module 13a. At the last stage of closing of the gap between the disc 17 and the abutment surface 22 the annular nozzle is created which due to the Venturi effect expedites the displacement of the disc 17 and brings it into a closed position.

The application of the disc 17 yields beneficially low mass to surface ratio, which in turn influences the quick closing behavior of the compression valve module 13a (due to low inertia of the disc 17) and improves durability of the valve module 13a, as the impact forces accompanying the valve module operation are small. Since the mass of the disc 17 is relatively small, the impact forces on the abutment surface 22 shall not lead to the system failure or noise generation.

When the disc 17 is in its closed position, the restricted flow of fluid takes place through the number of passages 24a spaced angularly through the disc 17, which leads to an increase of the damper force and generates high pressure difference across the compression valve module 13a resulting in generation of the force considerably exceeding reaction force of the cramped spring 18 which pressure acting upon the disc 17 maintains its close position. When the velocity of piston assembly 3 diminishes below a selected level, the compression spring 18 lifts the disc 17, opening the main oil flow through the annular gap between the bottom surface of the disc 17 and the abutment surface 22.

Figure 2:
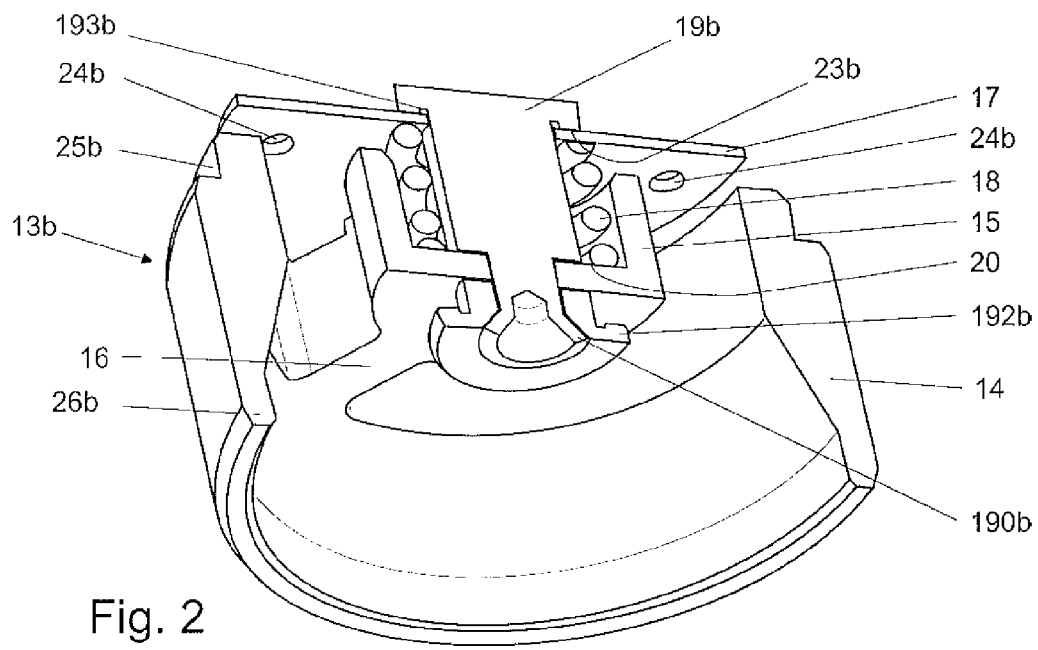
FIG. 2 is a cross-sectional perspective view of a second embodiment of a compression valve module according to the present invention.

Reference is now made to FIG. 2 showing cross-sectional perspective view of a second embodiment 13b of the compression valve module in the open position. Reference numerals of the same functional elements described below correspond to those from FIG. 1 with additional suffixes (b-f) added where appropriate to distinguish particular embodiments of the invention and their distinct constructional features performing the same functions.

In this embodiment, the fixing portion 190b of the retaining bolt 19b has a form of a rivet with an unshackled head extending over the conical internal surface of the bushing 192b. Further one of the two bridge members 16 joining the inner cylindrical member 15 with an inner surface of the outer cylindrical member 14 is shown. In this embodiment the head of the retaining bolt 19b is provided with an annular recessed groove 193b which shall be described later with reference to FIG. 3b. Although the bottom surface 23b of the bolt 19b head defines the disc open position, one skilled in the art will appreciate that a reverse construction, that is a bolt passing through the base surface 20 of the inner cylindrical member 15 and through disc 17 and secured at the top by a bushing or nut is equally possible.

The outer cylindrical member 14 is provided at the top with an annular recession 25b and at the bottom part extends into a flange 26b. The shape of the recession 25b and the shape of the flange 26b correspond to each other and are chosen with respect to the type of connection between the internal tube 2 and the base valve assembly 6 of the damper which shall be supplemented by the compression valve module 13b. In this case it is a simple forced-in joint.

Figure 3B:
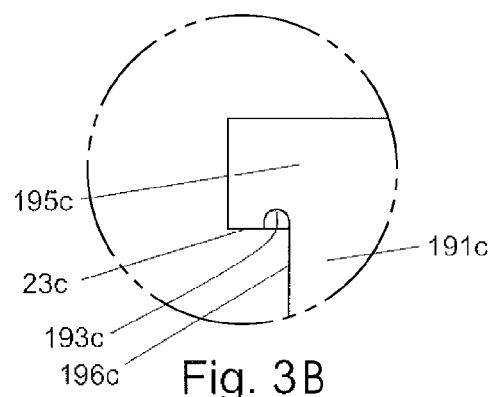
FIG. 3a shows a cross-section of a third embodiment of a compression valve module with an enlarged detail of the retaining bolt shown as FIG. 3b.
Figure 3A:
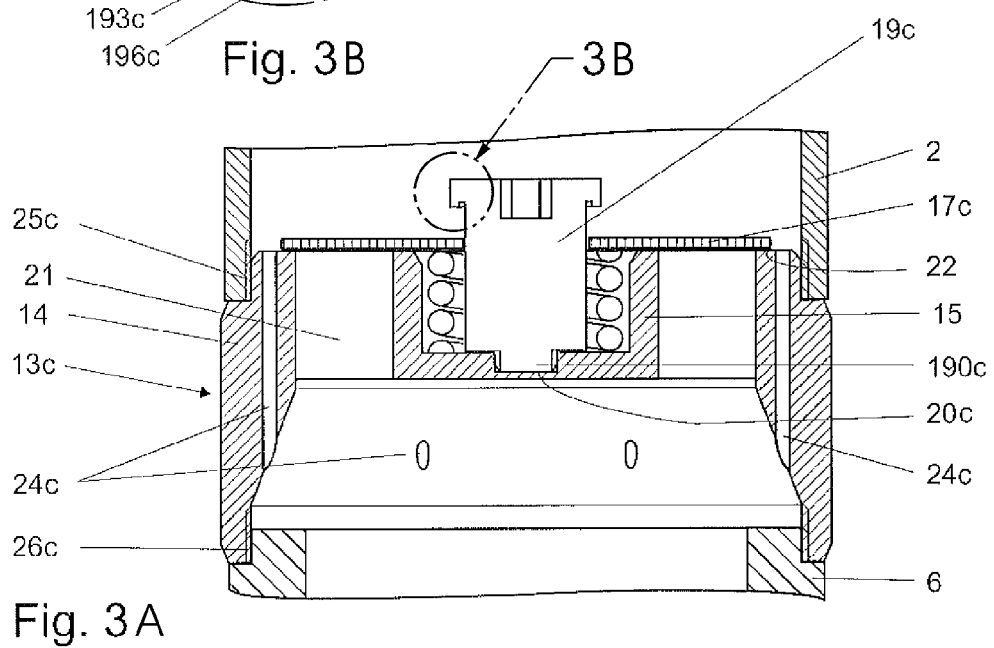

FIG. 3a shows a third embodiment of a compression valve module 13c. In this embodiment the base surface 20c of the inner cylindrical member 15c is provided with a centrally situated, bottom closed internally threaded opening into which the fixing portion 190c of the retaining bolt 19c in a form of a screw is screwed.

An enlarged detail in FIG. 3b shows the annular recessed groove 193c formed in the bottom surface 23c of the head 195c of the retaining bolt 19c which directly adjoins the outer surface 196c of the bolt 19c shaft 191c. The groove 193c improves the dimensional tolerance between the retaining bolt 19c and the closing disc 17. In bolts formed according to typical known processes, a fillet is present in the corner formed by the bolt head and the bolt shaft. As a consequence of using such a bolt in cooperation with the disc provided with central opening and tightly fitted to the bolt shaft, the disc 17 might become wedged to the bolt in the open position, and consequently its sliding movement into the closed position might not be possible. By forming the groove 193c, the upper surface of the disc 17 rests against the bolt head but the disc 17 retains its displacement capabilities. As an alternative to forming a groove in the bolt head, a chamfer can be formed along the edge of the central opening of the disk to eliminate the potential for interference between the disk and the bolt.

In this embodiment of the valve module 13c, the flow passages 24c enabling flow of damping fluid through the compression valve module are formed in the main outer tubular member 14 in such a way that their upper outlets are arranged outside the outer circumferential edge of the disc 17 close to the abutment surface 22.

The outer cylindrical member 14 is provided at the top with an annular recession 25c with an external thread on its circumferential wall and at the bottom part extends into a flange 26c provided with an internal thread. Threads 25c and 26c enable fixing the compression valve module 13c to the internally threaded end of the damper internal tube 2 and to the externally threaded body of the base vale assembly 6c if this type of connection was used to join the tube to the base valve assembly beforehand.

Figure 4:
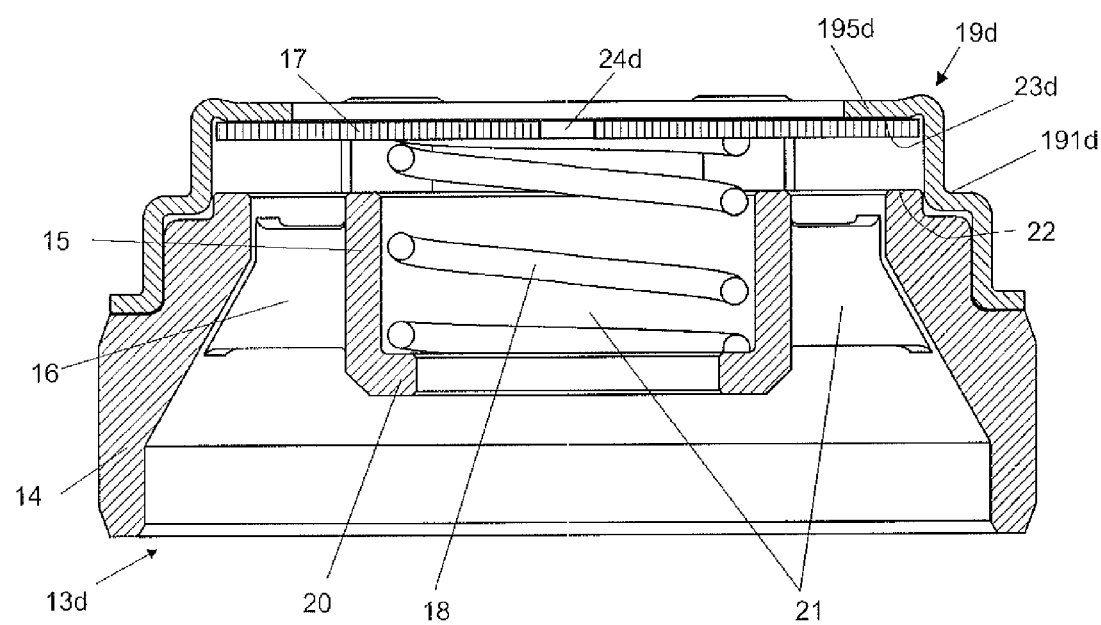
FIG. 4 is a cross-sectional view of a fourth embodiment of a compression valve module according to the present invention.
Figure 5:
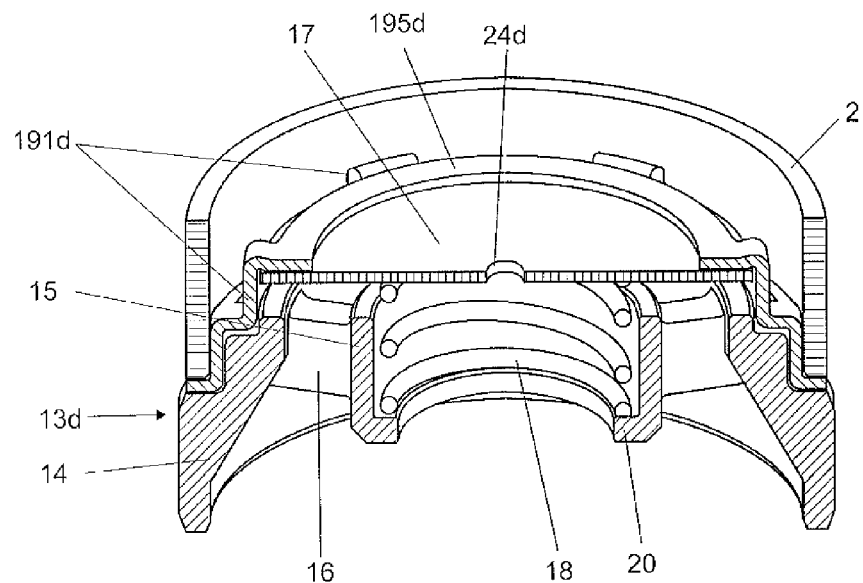
FIG. 5 is a cross-sectional perspective view of the fourth embodiment of a compression valve module according to the present invention.

Reference is now made to FIG. 4 and FIG. 5 depicting a fourth embodiment of a compression valve module according to the present invention. Retaining means have in this embodiment a form of a cup-shaped cage member 19d, which is secured to the outer tubular member 14. The cage member 19d comprises an annular part 195d and a number of shaped arms 191d extending away from the annular part. The shaped arms 191d are attached to the outer tubular member 14. The disc open position is defined by an abutment surface 23d of the annular part 195d which is spaced from the abutment surface 22 in the axial direction L. In this embodiment the inner tubular member 15, having cylindrical shape, is partially closed at one end (the end adjacent the base valve assembly 6) with a base surface in a form of an inturned lip 20, and the spring 18 is compressed between the inturned lip 20 and the disc 17. Moreover the fluid flow passages 21 are defined between the outer 14 and the inner 15 tubular members, as well as through the inner tubular member 15, and the disc 17 is provided with only one central flow passage 24d which in the disc closed position remains in fluid communication with the flow passage 21 in the inner tubular member 15.

Figure 6:
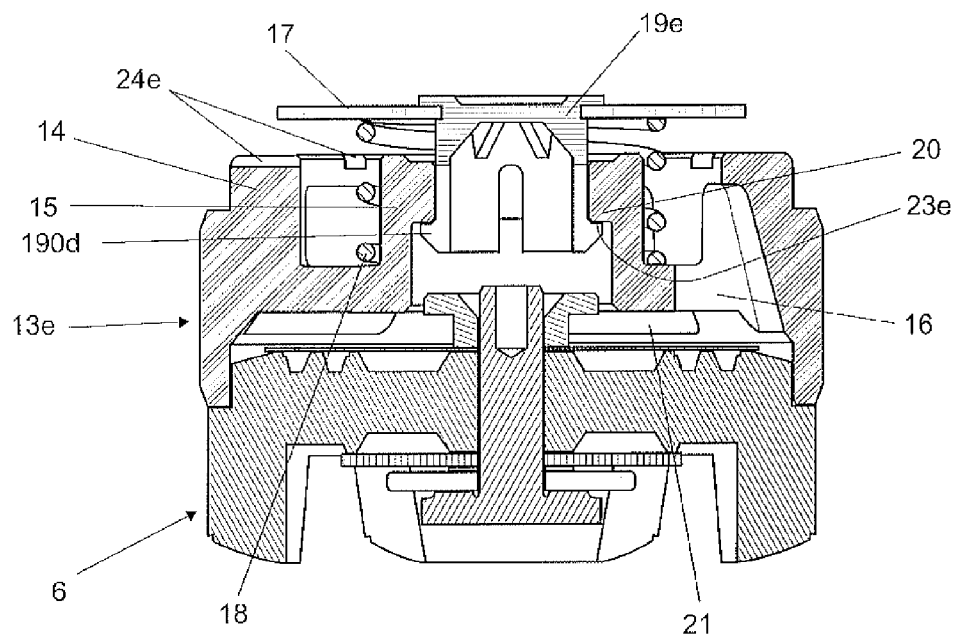
FIG. 6 is a cross-sectional view of a fifth embodiment of a compression valve module.

FIG. 6 shows a fifth embodiment of a compression valve 13e according to the present invention. The disc 17 is secured to the inner cylindrical member 15 by means of a plastic snap lock bolt 19e which is pushed downwardly into the inner tubular member 15 until its fixing portions 190d snap over the bottom surface of the inturned lip 20. In this embodiment the snap lock bolt 19e after assembling is fixed to the disc 17 so that it remains movable along and to some extent also around the longitudinal axis with the disc 17. The disc open position is defined by the surface of engagement 23e of the top surface of the fixing portions 190e of the snap lock bolt 19e with the bottom surface of the inturned lip 20 on which the snap lock bolt 19e rests in the disc open position. Further in this embodiment a number of flow passages 24e are distributed angularly in the abutment surface 22 of the outer tubular member 14.

Figure 7:
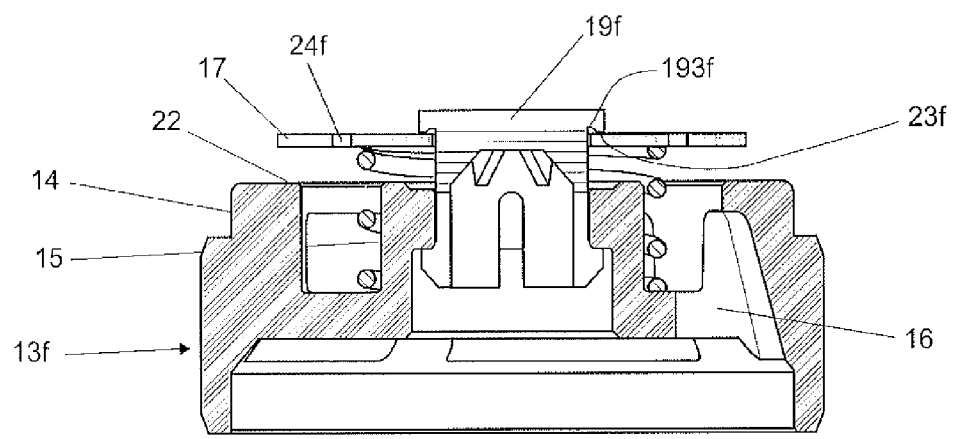
FIG. 7 is a cross-sectional view of a sixth embodiment of a compression valve module.

FIG. 7 illustrates the sixth embodiment of a compression valve 13f in which the retaining means is also a snap lock bolt 19f. However, as compared to the embodiment shown in FIG. 6, both the disc 17 and the bolt 19f may move independently along the longitudinal axis L. Nonetheless the function of the bolt 19f is similar to that of the retaining bolt of the first, second and third embodiment of the present invention (cf. FIG. 1-3). The bottom surface 23f of the bolt 19f head defines the disc open position and is also provided with an annular recessed groove 193f which directly adjoins the outer surface of the bolt 19f shaft (cf. FIG. 3b).

One skilled in the art will appreciate that other snap-lock connections than those shown in FIGS. 6 and 7 are equally possible to employ as retaining means according to the present invention.

All the above mentioned features of the compression valve modules 13a-13f remain substantially the same within a large range of dimensional tolerance of its components, and even some eccentricity in the axial displacement of the retaining means, the spring, or the disc with regard to the damper longitudinal axis L is fairly acceptable. Therefore the production specific losses are minimized and the cost of large scale production of the valve module is substantially decreased. Also other types of mounting the compression valve module 13 between the base valve 6 and the internal tube 2 of damper shall be readily available to persons skilled in the art.

The design parameters of the compression valve module 13 by means of which one may set the velocity threshold, the reaching of which triggers its operation, are the area of the pressure actuated surface of the disc 17, the force of the compression spring 18 and the width of the gap between the bottom surface of the disc 17 and the abutment surface 22. The design parameters influencing the behavior of the valve module 13 after reaching the engaging velocity are the number and the shape (e.g. diameter) of the passages (24a, 24b, 24d, 24f) in the disc 17 and/or passages (24c, 24e) in the outer tubular member 14 where the passages may be additionally or alternatively envisaged.

The above embodiments of the present invention are merely exemplary. The figures are not necessarily to scale, and some features may be exaggerated or minimized. These and other factors however should not be considered as limiting the invention, the scope of which is indicated in appended claims.

The invention claimed is:

1. A hydraulic damper comprising
   a tube filled with working fluid;
   a piston assembly slidably positioned inside the tube and including a compression valve assembly and a rebound valve assembly;
   a piston rod attached to the piston assembly and extending out a first end of the tube;
   a fluid compensation chamber located outside of the tube;
   a base valve assembly at a second end of the tube for controlling the flow of working fluid between the tube and the compensation chamber; and
   a compression valve module attached to the base valve assembly inside the tube; wherein said compression valve module comprises
   a substantially rigid disc having an outside diameter less than the inner diameter of the tube,
   an outer tubular member secured to the tube,
   an inner cylindrical member substantially coaxial with the outer tubular member,
   at least one radially extending bridge member securing the inner cylindrical member to the outer tubular member,
   an abutment surface for the disc defined by at least one of the inner cylindrical member and the outer tubular member,
   a bolt secured to at least one of the inner cylindrical member and the outer tubular member and including a bolt shaft passing through the inner cylindrical member and the disc and a head presenting a bottom surface defining a disc open position spaced from the abutment surface in an axial direction and an annular recessed groove that directly adjoins the outer surface of the bolt shaft, and
   a spring acting on the disc to bias the disc to its open position, wherein the disc is movable between the open position to allow free fluid flow through the compression valve module and the abutment surface to substantially prevent or restrict fluid flow through at least one flow passage.

2. The hydraulic damper according to claim 1, wherein the bolt is movable in the axial direction.

3. The hydraulic damper according to claim 1, wherein the inner cylindrical member is substantially tubular, and the spring is retained inside the inner cylindrical member.

4. The hydraulic damper according to claim 1, wherein the outer tubular member is provided with an annular recession and the flange corresponding to the type of previous connection between the tube and the base valve assembly of the damper.

5. The hydraulic damper according to claim 1, wherein the outer tubular member, the inner cylindrical member, and the bridges of the compression valve module are made as one element.

6. The hydraulic damper according to claim 5, wherein the outer tubular member, the inner cylindrical member, and the bridges are manufactured by sintering or cold press forming.

7. The hydraulic damper according to claim 1, wherein the disc defines at least one flow passage.

8. The hydraulic damper according to claim 1, wherein the outer tubular member and the inner tubular member define at least one flow passage therebetween.

9. The hydraulic damper according to claim 1, further comprising a plurality of compression valve modules located in series stacked one on top of the other.

10. A hydraulic damper comprising
a tube filled with working fluid;
a piston assembly slidably positioned inside the tube and including a compression valve assembly and a rebound valve assembly;
a piston rod attached to the piston assembly and extending out a first end of the tube;
a fluid compensation chamber located outside of the tube;
a base valve assembly at a second end of the tube for controlling the flow of working fluid between the tube and the compensation chamber; and
a compression valve module attached to the base valve assembly inside the tube; wherein said compression valve module comprises
a substantially rigid disc having an outside diameter less than the inner diameter of the tube,
an outer tubular member secured to the tube,
an inner cylindrical member substantially coaxial with the outer tubular member,
at least one radially extending bridge member securing the inner cylindrical member to the outer tubular member,
an abutment surface for the disc defined by at least one of the inner cylindrical member and the outer tubular member,
a cup-shaped cage member secured to the outer tubular member and including an annular part presenting an abutment surface of the annular part defining a disc open position and a number of shaped arms attached to and extending between the annular part and the outer tubular member, and
a spring acting on the disc to bias the disc to its open position, wherein the disc is movable between the open position to allow free fluid flow through the compression valve module and the abutment surface to substantially prevent or restrict fluid flow through at least one flow passage.

11. The hydraulic damper according to claim 10, wherein the inner cylindrical member is substantially tubular, and the spring is retained inside the inner cylindrical member.

12. The hydraulic damper according to claim 10, wherein the outer tubular member is provided with an annular recession and the flange corresponding to the type of previous connection between the tube and the base valve assembly of the damper.

13. The hydraulic damper according to claim 10, wherein the outer tubular member, the inner cylindrical member, and the bridges of the compression valve module are made as one element.

14. The hydraulic damper according to claim 13, wherein the outer tubular member, the inner cylindrical member, and the bridges are manufactured by sintering or cold press forming.

15. The hydraulic damper according to claim 10, wherein the disc defines at least one flow passage.

16. The hydraulic damper according to claim 10, wherein the outer tubular member and the inner tubular member define at least one flow passage therebetween.

17. The hydraulic damper according to claim 10, further comprising a plurality of compression valve modules located in series stacked one on top of the other.

* * * * *